Figure 1:
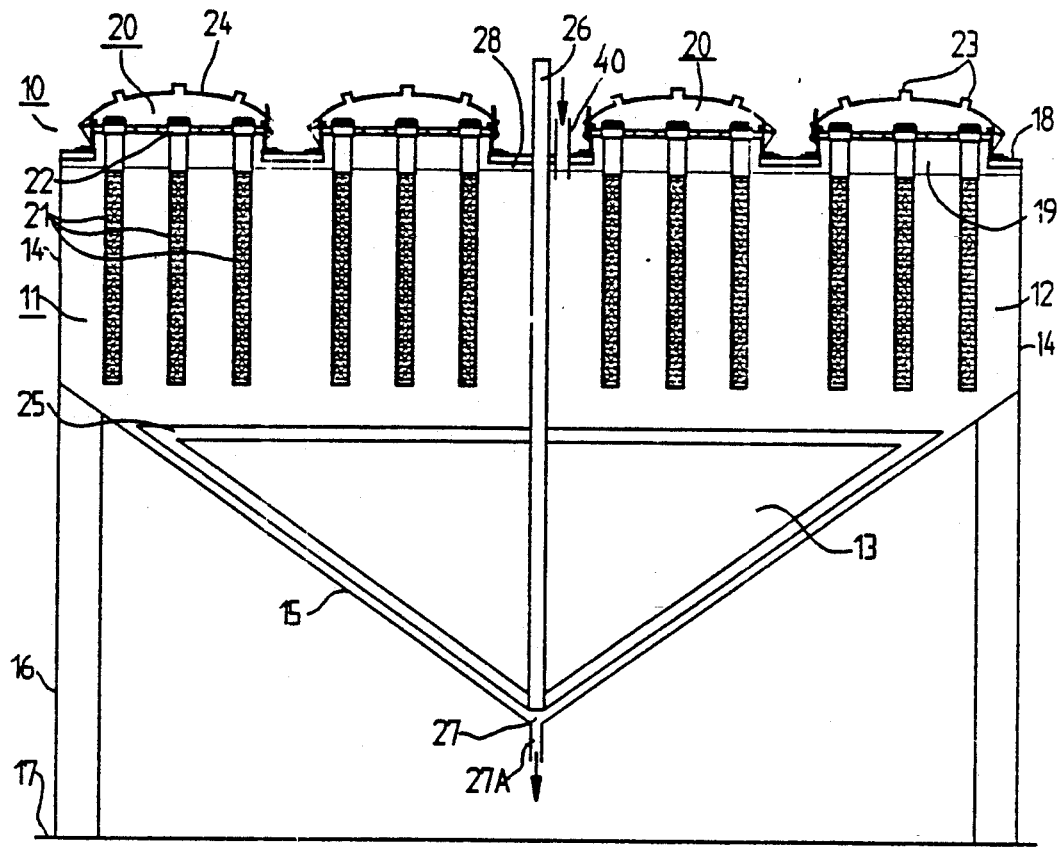

United States Patent [19]

Bogen et al.

[11] Patent Number: 5,227,076
[45] Date of Patent: Jul. 13, 1993

[54] METHOD AND APPARATUS FOR THICKENING FINE PARTICLE SUSPENSIONS

[75] Inventors: Jan O. Bogen, Kvicksund; Marie-Louise S. Olstedt-Wallin, Sala, both of Sweden

[73] Assignee: Sala International AB, Sala, Sweden

[21] Appl. No.: 837,914

[22] Filed: Feb. 20, 1992

[30] Foreign Application Priority Data

Mar. 25, 1991 [SE] Sweden .................... 9100885

[51] Int. Cl.⁵ .................... B01D 24/46; B01D 24/00
[52] U.S. Cl. .................... 210/791; 210/257.2; 210/333.01; 210/323.2; 210/333.1
[58] Field of Search ............ 210/650, 806, 108, 323.2, 210/324, 333.01, 321.78, 321.79, 321.8, 321.87, 321.88, 321.89, 791, 333.1, 257.2, 195.2, 256

[56] References Cited

U.S. PATENT DOCUMENTS

| | | | |
|---|---|---|---|
| 3,870,638 | 3/1975 | Karpacheva et al. | 210/333.01 |
| 4,405,466 | 9/1983 | Giannelli et al. | 210/323.2 |
| 4,540,490 | 9/1985 | Shibata et al. | 210/323.2 |
| 4,552,669 | 11/1985 | Sekellick | 210/323.2 |
| 4,591,446 | 5/1986 | Müller | 210/323.2 |
| 4,836,936 | 6/1989 | Schewtz | 210/323.2 |
| 4,872,981 | 10/1989 | Hobson, Jr. | 210/323.2 |

FOREIGN PATENT DOCUMENTS

| | | | |
|---|---|---|---|
| 244878 | 3/1912 | Fed. Rep. of Germany . | |
| 765362 | 4/1971 | France | 210/333.01 |
| 1284317 | 11/1989 | Japan | 210/323.2 |
| 2600339 | 7/1976 | Netherlands | 210/323.2 |
| 9104778 | 4/1991 | PCT Int'l Appl. | 210/333.01 |
| 657066 | 8/1986 | Switzerland . | |
| 1503857 | 8/1989 | U.S.S.R. | 210/323.2 |

OTHER PUBLICATIONS

Minerals & Metallurgical Processing, Aug. 1990, pp. 169-171.

*Primary Examiner*—Robert A. Dawson
*Assistant Examiner*—Ana M. Fortuna
*Attorney, Agent, or Firm*—Burns, Doane, Swecker & Mathis

[57] ABSTRACT

The invention relates to a method for thickening and clarifying fine particle suspensions, wherein the suspensions are thickened and clarified in combination with a back-pulse filtration process. The method is characterized by partially submerging one or more filter modules in the fine particle suspension concerned, in open vessels or reservoirs. The suspension is back-pulse filtered in these open vessels or reservoirs with the aid of the filter modules. The invention also relates to a filter module which includes one or more parallel working, vertical hollow-tubular filters, and a device for delivering liquid and optionally air to the filter module and removing the liquid and air therefrom during filter operation, this device being common to all filters. The filter module is characterized in that the filters are mounted in a plate and that the plate is covered by an easily opened lid which, when closed, seals against the plate. The lid also includes connectors through which liquid and air are delivered to and removed from the module.

17 Claims, 1 Drawing Sheet

METHOD AND APPARATUS FOR THICKENING FINE PARTICLE SUSPENSIONS

The present invention relates to a method for thickening and clarifying fine particle suspensions, in which thickening and clarification of the suspensions is effected while simultaneously subjecting the suspensions to a back-pulse filtering process. The invention also relates to apparatus in the form of a filter module for carrying out the method.

Thickening and clarification of fine particle suspensions is often carried out in the form of a gravitational separation process, by causing the particles to settle in large thickening units, i.e. separation vessels which have large cross-sectional areas, so as to effect the separation process as economically as possible. The use of conventional textile filter devices has been found too uneconomical for thickening fine particle suspensions, among other things for the reasons stated in the following. The finer the solid particles in the suspension, the more difficult it is to retain the particles in a sufficiently thick layer on the filter cloth, and also because those particles which are retained by the filter cloth agglomerate strongly to form a continuous filter cake which is difficult to remove by those methods which are applied in present-day conventional filtering processes. Thus, as before mentioned, conventional filtering processes become increasingly more difficult to carry out effectively with increasing fineness of the solid particles in the suspension, and in addition gravitational separation of the particles in large thickeners becomes less and less effective, since the rate at which the particles settle is greatly reduced with decreasing particle sizes. This results in impaired production, and consequently it is necessary either to use large suspension thickening units for one and the same suspension values and/or flocculating agents must be added in order to improve sedimentation. Flocculating chemicals, however, are costly, both with respect to purchase and handling, and they often constitute an undesirable load on or an undesirable constituent of the thickened product. An alternative solution is a combined sedimentation and filtration process, wherein the coarser particles settle gravitationally and the finer particles are captured by filters, although such methods have not hitherto been suggested. Although there have been introduced on the market new filter media which enable progressively finer particles to be captured, the aforesaid problem caused by blocking of the pores of the filter cloths has become even worse, as has also the problem of removing the filter cakes formed. A combined method of the aforesaid kind would then require extremely large filter surfaces, so as to reduce the specific load on the filtering process to the greatest possible extent.

CH-A-657 066 teaches a method of thickening suspensions continuously with the aid of a tubular filter element provided in a closed filter thickener. With the intention of freeing the filter elements from filter-blocking cakes, the filter elements are arranged in a plurality of mutually parallel collector tubes which can be shut-down one at a time. A pressure surge, for instance an air surge, is then transmitted through the collector tube and to the filter element connected thereto, in a direction which is opposite to the filtering direction, so as to free the filter elements from filter cakes formed thereon. DE-C-244 878 describes and illustrates a closed filter thickener of an older, more complicated construction, in which filter elements can be blown clean without interrupting the filtering process.

A filtering method which, to some extent, utilizes similar filter thickeners has recently been described in an article by G. R. S. Smith and C. R. Rinschler in Min. & Met. Proc., Aug. 1990, page 169 ff. This method is called "back-pulse filtration" in the article, and this term is used in the present document to define a reversal of flow back through the filter.

The development of progressively more effective filter media has made it possible to capture finer particles, although the problems caused by blocking of the filters and cleaning of the filters has increased therewith, as before described. The aforesaid back-pulse filtration method, however, solves part of these problems. Thus, the filtration process is carried out with tubular filters comprised of highly effective filter media based on expanded polytetrafluoroethylene (PTFE). Such filter media are retailed, for instance, under the trade name GORE-TEX. The tubular filters comprised of such filter media function in approximately the same manner as the bag-houses used for cleansing gases. Subsequent to filtering the particle suspension for a given period of time, the liquid flow is reversed so as to pass the liquid that has already been filtered back through the filter medium and therewith disintegrate the filter cake that has formed on the outer surface of the filter. This reversal of the flow is interrupted after a very short time period, for instance a time period of 1-3 seconds, and the liquid flow is then again reversed and passed through the filter, and in practical terms the filtering process can therefore be considered to be a continuous process. The disintegrated pieces of filter cake loosen from the filter medium and fall quickly to the bottom of the filter to form a high-density suspension, since these disintegrated pieces of filter cake will not re-dissolve. A thickened suspension can therefore be removed from the bottom of the filter. The filtration process may be carried out with the aid of pumps, under suction or pressure. The filters may be completely closed, so as to enable toxic or inflammable liquids to be treated.

It is stated in the aforesaid article that back-pulse filtration is suitable for several different applications, among other things as an alternative to gravitational separation for thickening suspensions in certain cases, for example for filtering metal hydroxides, white water in paper machines, sludge obtained when desulphuring waste gases, and industrial waste solutions. A combined filtration-clarification process is also proposed for the treatment of white water from paper machines, which can be said to be a high-density suspension, there being used a large vessel with a straight bottom in which sedimentation and back-pulse filtration processes are used.

The extent to which back-pulse filtration can be used for thickening and clarifying fine particle suspensions according to the above, however, is limited by the costs of the filtration process, which requires the treated product to have or at least to obtain a certain value which justifies the increase in costs. For practical reasons, the size of the filter units must be limited to some extent, and the areas of the filter surfaces must therefore also be limited.

One reason why the size of the filter surfaces and the separation vessels used in back-pulse filtration according to the known technique are limited in practice is because of the large volumes of filtered liquid that must be reversed when practicing said method, this reversal of the liquid flow requiring, among other things, the use of large, technically advanced pumps. If an individual tubular filter should become blocked, it would also be necessary to shutdown the entire filter unit while the blocked filter is being cleaned.

The object of the present invention is to provide a method and apparatus for thickening and clarifying fine particle suspensions in accordance with the introduction while back-pulse filtering the suspension at the same time, thereby enabling thickening and clarifying of the suspension to be carried out without the need for special vessels and without drawbacks of the aforementioned kind having a negative influence on the filtering operation. To this end, the inventive method is characterized by the steps set forth below and the inventive apparatus has the form of a separate filter module described in greater detail below.

Thus, according to the invention, back-pulse filtration is carried out simultaneously with the thickening and clarifying process, with the aid of filter modules which are partially submerged in the suspension. The filtering process is preferably carried out in several, mutually separate operative filter modules arranged generally uniformly over the surface of the suspension. According to the invention, the filter modules may be submerged in the vessel or the like in which the suspension is otherwise treated, or in another vessel or the like which is specially constructed for this purpose, or directly in some form of reservoir in which the suspension happens to be found, such as in waste dams, lakes or wells. It is suitable and also advantageous to control filtration in each filter module separately, with respect to the prevailing filtering ability of each module per se, this control being followed-up continuously. This control may be effected, for example, by continuously measuring the pressure drop across each separate module and by reversing the filtration process when this level has reached a predetermined value, so as to disintegrate and remove the filter cake. It is also possible, of course, to control the individual modules in some other way, for example in accordance with a predetermined time schedule, so as to ensure the total thickening process in the unit will be disturbed to the least possible extent. As will be understood, individual modules can be disconnected and removed from the thickener at any time whatsoever when difficult filter blockages occur or when a filter becomes damaged or when the filter ceases to function effectively for some other reason. This enables an individual, defective module to be repaired without needing to interrupt the operation of the thickening unit as a whole.

According to the present invention, each filter module comprises one or more tubular filters which are mounted vertically on a plate and which work in parallel, and a device which is common to all filters and which functions to deliver liquid and optionally also air to and to remove said liquid and said air from the filters. The device for supplying liquid to and removing liquid from the filters includes a cover member or lid which, in operation, lies sealingly against the filter mounting plate and over the filters of the module and which includes pipe connectors for connection to external lines. These lines are connected to a suitable type of pump arrangement for delivering the pulsated liquid and for removing said liquid, as required in the back-pulse filtration process. A suitable type of pump in this respect is a peristaltic pump, since this type of pump is able to carry out rapid pump reversals. When large quantities of filtrate are involved, simpler vacuum-based pump arrangements can be used. The process may also be effected with the aid of a simple pump arrangement based on a siphon principle.

The inventive filter module preferably has a circular cross-section and the filters are preferably arranged with one filter array arranged in a circle. The upper part of each tubular filter in the filter module, this upper part not being in contact with the suspension, is preferably made impermeable to air. In order to facilitate repair, etc. of the filter modules, each tubular filter is preferably removable individually from the module.

Figure 2:
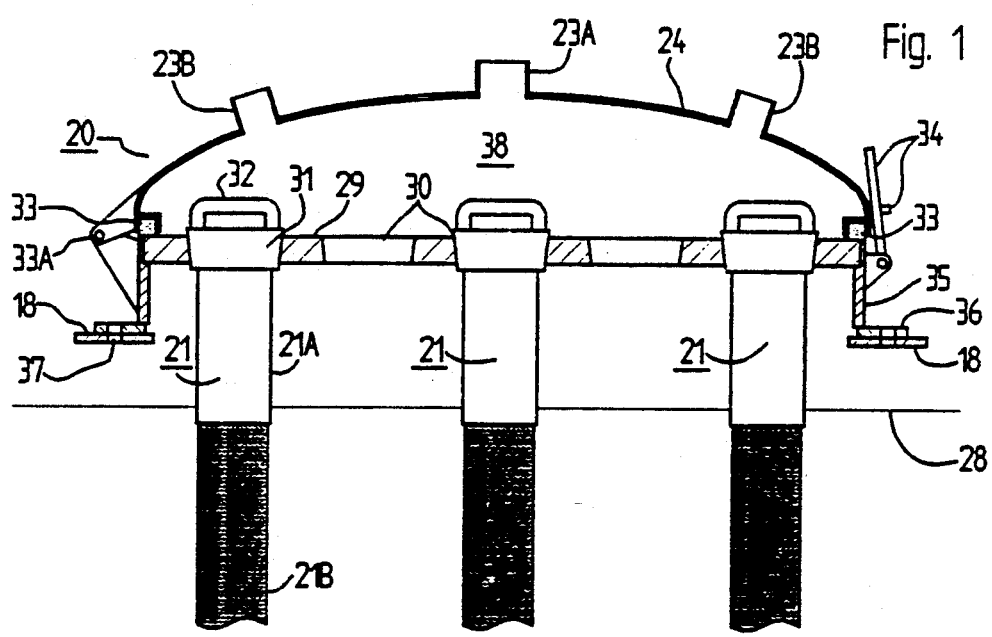

The invention will now be described in more detail with reference to the accompanying drawing, in which
FIG. 1 is a cross-sectional, side view of a thickener; and
FIG. 2 is a cross-sectional view of the upper part of an inventive filter module.

FIG. 1 illustrates a large thickener 10 comprising a settling or sedimentation chamber 11 which has an upper cylindrical part 12 and a lower conical part 13. The settling chamber is defined by a circular wall 14 and a conical bottom 15. The thickener 10 also comprises a stand 16 which rests on a foundation or supporting surface 17. Extending over the chamber 11 is a floor 18 which rests on the top of the wall 14. The floor 18 has provided therein a plurality of bores 19, each accommodating an inventive filter module 20, of which four are shown in the Figure. The bores 19 are preferably disposed in a circle over the surface of the floor 18. In the case of the FIG. 1 embodiment, it is conceivable to arrange the bores 19 around two circles of mutually different diameter and with a common center in the middle of the floor. Each filter module 20 comprises a plurality of hollow, tubular filters 21, of which three are shown in the Figures. The tubular filters 21 may also be arranged so that the majority of the filters will be located in a circle in each module 20, in a manner similar to that described with reference to the modules 20, although one filter 21 is preferably located in the center 22 of the module 20. Each filter module 20 is provided with one or more pipe connectors 23 in its lid or cover 24. In the illustrated embodiment, each lid 24 is provided with three pipe connectors 23, although in some cases a single pipe connector 23 is sufficient. The thickener 10 is also equipped with a rotatable scraper 25 which is driven by a shaft 26 connected to a drive means (not shown). The scraper 25 is intended to scrape away the thickened suspension on the bottom of the thickener, this thickened suspension containing solids which fall down from the filters and settle on the bottom of the thickener, so as to enable the thickened suspension to be removed from the thickener 10 through a line 27A, as indicated by a vertical arrow. During the thickening process, the liquid suspension to be thickened is delivered essentially continuously to the thickener 10 through an inlet 40 and the clarified liquid is removed from the thickener, essentially continuously, through at least one of the pipe connectors 23 in each module 20. The line 28 in FIG. 1 indicates the upper liquid level in the thickener 10 during operation.

FIG. 2 illustrates the upper part of one preferred embodiment of an inventive filter module 20. The filter module 20 includes a mounting plate 29 having provided therein a plurality of bores 30, of which five are shown in the Figure and of which three such bores each have a respective adapted tubular filter 21 mounted therein. Each tubular filter 21 is firmly mounted in the plate 29 with the aid of an adapter device 31 which is provided with a handle 32 by means of which the filter 21 can be fitted into and removed from a respective bore. The upper part of each filter 21 is provided with a gas impermeable mantle 21A, whereas the remainder of the filter 21 has a jacket or mantle 21B which consists of a filter medium for the filtration of very fine particles, preferably of the PTFE-type. The cover plate or lid 24 is fitted over the plate 29 so that, in operation, the module will be sealed against the surroundings in respect of the prevailing liquid pressure and/or air pressure within the module and beneath the lid 24. In the case of the illustrated embodiment, the lid 24 is sealed with the aid of a sealing strip 33. The lid 24 is pivotally mounted on a pivot pin 33A and is closed and locked by means of a module closing device 34. The entire filter module 20 rests on the floor 18, along the edge of the opening 19, through the intermediary of a vertical strut 35 and a frame 36 connected thereto, and can be screwed firmly to the floor 18 by means of bolts which extend through respective holes 37 in the floor 18 and in the frame 36.

In operation, the pipe connector 23A of the filter module 20 is connected to a pump, preferably to a peristaltic pump. The pump is then activated to pump liquid from the module and therewith to suck liquid from the thickener in which the module 20 is placed, through all of the filters 21 contained in the module 20, wherewith particulate material suspended in the liquid will fasten on the outer surfaces of the jackets 21B of the filters 21 located beneath the liquid level 28 and there form a constantly growing filter cake. The liquid passing through the filter medium in the filter mantle 21B is drawn by suction up into the space 38 defined between the lid 24 and the module mounting plate 29 around the upper parts of the filters 21, and further through the pipe connector 23A to the pump (not shown). When the filter cakes on the filters 21 have grown to a thickness which begins to make filtering difficult, or when it is time to reverse the flow (back-pulse filtration) for some other reason, e.g. in accordance with a predetermined back-pulse filtration schedule, a signal to this effect is sent to the pump, which then immediately pumps liquid back through the pipe connector 23A and into the space 38 and down through the only possible paths that can be followed by the liquid, namely those paths which lead to the interior of the tubular filters 21, and out through the liquid-permeable, lower mantle 21B of respective filters 21. This back-pulse filtration causes the filter cake on the outer surface of the mantle 21B to fracture and disintegrate under the pressure exerted on the cake from the liquid flow arriving from the filter interior. The filter cake is therewith broken up and the smaller pieces of the filter cake fall down into the bottom of the thickener gravitationally. This back-pulse filtration process is continued for a brief, predetermined time period, normally 1-3 seconds, where-after the pump is again reversed and the liquid is again filtered normally, so as to form further filter cakes on the filters 21.

In order to obtain a quicker and more effective reversal process, compressed air may be used during the reversal period to displace the liquid in the space 38. The compressed air is delivered through one or through both of the pipe connectors 23B.

It will readily be seen from the aforegoing that the inventive method makes it possible to utilize a combination of sedimentation and filtration without needing to provide separate filter vessels herefor, and enables the filter surfaces to be given any desired size, so as to achieve effective thickening of the treated suspensions. By using a variable, predetermined number of filter modules, the total filtering surface can be selected from among a very large range of surface area, this range not being limited by the back-pulse filtration process.

We claim:

1. A method for thickening and clarifying a fine particle liquid suspension comprising partially submerging a plurality of hollow tubular filters provided with filter medium into the fine particle liquid suspension, said hollow tubular filters being grouped into a plurality of filter modules with each of said filter modules comprised of at least one of said hollow tubular filters, filtering the fine particle suspension by passing the liquid from the suspension through the filter medium to the interior of the hollow tubular filters thereby obtaining clarified liquid and accumulating fine particles on the filter medium, and removing accumulated fine particles on the filter medium by back-pulse filtration by reversing the liquid flow from the interior of the hollow tubular filters through the filter medium for short predetermined time periods wherein said filter modules are constructed and arranged so that at least one filter module filters the fine particle suspension to obtain clarified liquid or reverses the liquid flow to remove accumulated fine particles and wherein at least one other filter module may be simultaneously disconnected.

2. The method of claim 1 wherein the predetermined time period for the back-pulse filtration is from 1 to 3 seconds.

3. The method of claim 1 wherein compressed air is used during back-pulse filtration.

4. The method of claim 1 wherein the initiation of back-pulse filtration is determined by the thickness of the accumulated fine particles on the filter medium.

5. The method of claim 1 wherein the initiation of back-pulse filtration is on a time schedule.

6. The method of claim 1 wherein each of the filter modules is independently operable between filtering and back-pulse filtration.

7. The method of claim 1 wherein the removed accumulated fine particles is collected and removed from below the filter modules.

8. An apparatus for filtering fine particles suspensions comprising supporting means, a plurality of filter modules supported by said supporting means, each of said filter modules comprising a filter mounting plate and at least one hollow tubular filter provided with filter medium supported on the filter mounting plate, a removable cover for each filter module, said cover constructed and adapted to cover the filter mounting plate and receive liquid from the at least one hollow tubular filter and provided with a connection through which liquid can flow and wherein the cover of at least one filter module can be removed while at least one other filter module filters a fine particle suspension to obtain clarified liquid or while at least one filter module reserves liquid flow to remove accumulated fine particles from the filter medium.

9. The apparatus of claim 8 wherein each filter module has a circular cross-section.

10. The apparatus of claim 8 each filter module comprises at least one array of hollow tubular filters disposed in a circle.

11. The apparatus of claim 8 wherein the upper part of each hollow-tubular filter is substantially impermeable to air.

12. The apparatus of claim 8 wherein each hollow tubular filter can be individually removed from the filter module.

13. The apparatus of claim 8 wherein each cover is connected to a source of compressed air.

14. The apparatus of claim 8 wherein each filter module comprises a plurality of hollow filter tubes.

15. The apparatus of claim 8 wherein the supporting means is mounted on a sedimentation chamber having a cylindrical wall and conical bottom.

16. The apparatus of claim 15 wherein the sedimentation chamber is provided with a rotatable scraper.

17. The apparatus of claim 8 wherein the supporting means comprises a supporting floor with a plurality of bores which contain the plurality of filter modules.

* * * * *